United States Patent [19]

Skoda

[11] Patent Number: 4,815,697
[45] Date of Patent: Mar. 28, 1989

[54] DEPRESSURIZATION VALVE

[75] Inventor: George I. Skoda, Santa Clara, Calif.
[73] Assignee: General Electric Company, San Jose, Calif.
[21] Appl. No.: 184,734
[22] Filed: Apr. 22, 1988
[51] Int. Cl.[4] ............................................. F16K 31/44
[52] U.S. Cl. ...................................... 251/68; 251/364; 376/283
[58] Field of Search ...................... 251/66, 68, 74, 359, 251/364; 376/277, 283

[56] References Cited

U.S. PATENT DOCUMENTS

3,095,901  7/1963  Larson et al. .......................... 251/66

Primary Examiner—Deborah L. Kyle
Assistant Examiner—Richard W. Wendtland
Attorney, Agent, or Firm—Robert R. Schroeder

[57] ABSTRACT

A depressurization valve for use in relieving completely the pressure in a simplified boiling water reactor is disclosed. The normally closed and sealed valve is provided with a valve body defining a conduit from an outlet of a manifold from the reactor through a valve seat. A closing valve disk is configured for fitting to the valve seat to normally close the valve. The seat below the disk is provided with a radially extending annulus extending a short distance into the aperture defined by the seat. The disk is correspondingly provided with a longitudinally extending annulus that extends downwardly through the aperture defined by the seat towards the high pressure side of the valve body. A ring shaped membrane is endlessly welded to the seat annulus and to the disk annulus. The membrane is conformed over the confronted surface of the seat and disk in a C-sectioned configuration to seal the depressurization valve against the possibility of weeping. The disk is held to the closed position by an elongate stem extending away from the high pressure side of the valve body. The stem has a flange configured integrally to the stem for bias by two springs. The first spring acts from a portion of the housing overlying the disk on the stem flange adjacent the disk. This spring urges the stem and attached disk away from the seat and thus will cause the valve to open at any pressure. A second spring—preferably of the Belleville variety—acts on a latch plate surrounding and freely moving relative to the end of the stem. This second spring overcomes the bias of the first spring and any pressure acting upon the disk. This Belleville spring maintains through its spring force the valve in the closed position. At the same time, the latch plate with its freedom of movement relative to the stem allows the stem to thermally expand during valve temperature excursion. The latch plate in surrounding the stem is limited in its outward movement by a boss attached to the stem at the end of the stem remote from the disk. The latch plate is held normally closed by three radial latches spaced at 120° around the periphery of the plate.

9 Claims, 6 Drawing Sheets

DEPRESSURIZATION VALVE

The U.S. Government has rights in this invention under Department of Energy Contract No. DE-AC03-86SF16563.

BACKGROUND OF THE INVENTION

This invention relates to pressure relief valves. More particularly, a pressure relief valve sealed against leakage is disclosed which upon actuation will open immediately independent of any pressure acting on the seat.

SUMMARY OF THE PRIOR ART

Boiling water nuclear reactors are known. Newer designs or so-called "simplified boiling water reactors" are designed for response to operating transients with minimal complication.

One type of operating transient to which response is required requires that the reactor be immediately depressurized. Characteristic of this type of transient is the Anticipated Transient Without Scram (ATWS). In this type of transient scenario it is assumed that the control rods should have been inserted but have not been during the transient. At the same time, it is additionally assumed that the reactor core is in danger of becoming uncovered because of loss of coolant. Flooding the core with cool moderating water is required for at least temporary control of the reactor.

Flooding of the reactor is provided from a gravity suppression pool. Typically the gravity suppression pool is located above the reactor vessel so that gravity flow of water into the reactor core is sufficient to control the transient event. In order to allow the moderating water to enter the reactor, the reactor must be at a pressure well below the static head of the water being introduced to flood the reactor. Since this water is near atmospheric pressure substantially any pressure within the reactor should be instantaneously relieved. It will be noted that design requires that the Anticipated Transient Without Scram be accommodated at all operating states of the reactor. For example, it must be assumed that the transient can occur during reactor start-up—when the reactor is at an extremely low pressure—as well as during full operating pressure. Taking the scenario when the reactor is at a low operating pressure, it will immediately be realized that the pressure may be just sufficient to prevent the entry of the required coolant.

At the same time, most depressurization valves rely on the pressure that they are to relieve for part of their opening force. For the depressurization herein required, such reliance cannot be placed. Specifically, the depressurization valves required must open no matter what pressure is present in the reactor.

Normally closed valves such as safety valves and depressurization valves ofttimes leak. While small leakage can on occasion be accepted, this leakage usually deteriorates into large leakage, which is highly undesirable for several reasons. It allows radioactive steam outside the drywell, it lowers the plant overall efficiency and heats up the suppression pool, which suppression pool should be maintained cool.

SUMMARY OF THE INVENTION

A depressurization valve for use in relieving completely the pressure in a simplified boiling water reactor is disclosed. The normally closed and sealed valve is provided with a valve body defining a conduit for pressure relief from the reactor through a valve seat. A closing valve disk is configured for fitting to the seat to normally close the valve.

The seat below the disk is provided with a radially extending seat annulus extending a short distance into the aperture defined by the seat. The disk is correspondingly provided with a axially extending disk annulus that extends downwardly towards the high pressure side of the valve body. A ring shaped membrane is endlessly welded to the annulus and to the disk annulus. The membrane is conformed over the surface of the sealed seat disk in a C-sectioned configuration to seal the depressurization valve against the possibility of leakage.

The disk is held to the closed position by an elongate stem extending away from the high pressure side of the valve body. This stem when moved away with the disk permits opening of the valve to a discharge flange extending at right angles from the valve body.

The stem is conventionally bellows-sealed at a valve plate and has a flange configured integrally to the stem for bias by two springs. The first spring acts from a portion of the housing overlying the disk on the stem flange. This spring urges the stem and attached disk away from the seat and thus will cause the valve to open at any reactor pressure.

A second spring—preferably of the Belleville variety—acts on a latch plate surrounding and freely moving relative to the end of the stem. This second spring overcomes the bias of the first spring and any pressure acting upon the disk. This second Belleville spring thus maintains through its spring force the valve in the closed position. The latch plate with its freedom of movement relative to the stem allows the stem to thermally expand during temperature excursion.

The latch plate in surrounding the stem is limited in its outward movement by a boss attached to the stem at the end of the stem remote from the disk. The latch plate is held normally closed by three radial latches spaced at 120° around the periphery of the plate. Each of these radial latches pivots on a pin. Each latch includes a short lever arm for maintaining the latch plate in position to normally close the valve, an intermediate pivot, and a long lever arm having a cam follower.

A circular plate surrounds the valve body at a position above the seat and disk. This circular plate is rotatable with respect to the valve body and their latches. This plate has three L-sectioned cam cutouts, each cam cutout engaging a cam follower at the ends of the latches.

The cam cutouts are "L" shaped and include first a circumferential cam surface for maintaining the levers in a position to latch the latch plate which maintains the valve in the normally closed position.

Electromechanical rotation of the circular plate registers a radially extending section of the L-shaped cam cutout permitting the cam follower and each to move radially towards the center of the valve. Such movement causes simultaneous release of the latch plate by the short lever arms. Upon such release by the short lever arms, causes the latch plate to move dynamically upward impacting the boss at the end of the stem.

The impacted stem in turns yanks the disk free of the seat tearing the membrane open. Pressure relief is provided to the connected reactor even in situations where fluid pressure within the reactor would be insufficient by itself to cause valve opening.

OTHER OBJECTS, FEATURES AND ADVANTAGES

An object to this invention is to disclose a depressurization valve that can remain closed for long periods of time without the possibility of leakage. Accordingly, the valve body defines a valve seat for receiving a valve disk. A valve disk configured for mating engagement with the seat fits on the seat to close the pressurized side of the valve body.

The valve seat defines below the confronted disk a thin inwardly extending seat annulus. The valve disk at its lower surface peripherally surrounding the seat includes a thin disk annulus. The seat annulus, the seat. the disk and the disk annulus all define a smooth "C"-sectioned surface.

A ring shaped membrane having an outer endless boundary and an inner endless boundary is confronted over the smooth "C"-sectioned surface between the seat annulus and the disk annulus. The circular member is endlessly welded to the seat annulus at its outer endless boundary. The circular membrane is endlessly welded to the disk annulus at its inner endless boundary. There results a seat and flange connected by a membrane seal which is capable of opening by rupture upon parting of the seat and disk for immediate relief of pressure. At the same time and during the normally closed operating duration of the pressure relief valve the possibility of valve leakage is eliminated.

An advantage of the valve seat and disk combination is that the seat and disk annulus formed ideal sites for the endless welds of the membrane to the valve seat and disk. Further, the seat and disk can be prefabricated as a unit with the welded membrane in place. Thereafter the prefabricated seat and disk can be placed to the remainder of the valve body as a replacement part. The seat annulus and the valve annulus each provide ideal surfaces that can be easily worked and thereafter easily welded—with electron beam welding being preferred.

A further object of this invention is to disclose a valve stem for maintaining the disk firmly engaged to the seat during all thermal excursions of the valve caused by plant operation. According to this aspect of the invention, an elongated stem is secured to the seated disk and extends outwardly from the valve away from the pressurized side of the valve body. This valve stem is guided in movement by a guide cylinder and sealed by conventional bellows.

The valve stem defines a stem flange intermediate the ends of the stem and a stem boss at the extremity of the stem remote from the disk.

Two opposed springs act on the stem flange. A first spring acts between the valve body and that side of the stem flange adjacent the disk. This first spring acting under compression exerts a force on the stem tending to lift the disk free of the seat a all pressures contained by the valve.

A second spring—preferably of the Belleville variety—is compressed between a latch plate circumscribing the valve stem between the boss and the opposite side of the stem flange. This second spring acts with a bias exerted by the second spring to overcome the force of the first spring as well as any pressure encountered by the valve disk. Thus, the second Belleville spring maintains the valve in the closed position. At the same time, the stem and latch plate are free to relatively move. This relative movement enables the steam to expand and contract during thermal excursion of the valve.

Yet another object of this invention is to disclose a pressure discharge valve that will open at all operating states of the reactor including parts of the start-up cycle or shutdown cycle where the reactor pressure contained is low. Accordingly, the latch plate is maintained by a locking mechanism holding the valve shut. This latch plate, upon release, moves immediately under the bias of both the first and second spring upwardly relative to the stem. The latch plate, thus urged impacts at the distal end of the stem boss remote from the disk. The latch plate delivers at the boss a dynamic "hammer" blow. This dynamic upwardly directed hammer blow acts on the stem and attached disk to unseat the disk and tear the membrane. In short, instantaneous opening of the valve occurs.

An additional object of this invention is to disclose a latch mechanism for the sure release of the latch plate in response to opening required for the control of reactor transient. Accordingly, the latch plate is circular and surrounds the stem. Three levers, each lever placed around the circular latch plate, act on the plate at 120° intervals and hold the latch plate down and in the normally valve closed position.

Each of these lever arms have a short arm, an intermediate pivot, and a long lever arm. The long lever arm extends downwardly to and towards a valve circumscribing and rotating disk. Each lever arm adjacent the disk has a cam follower.

The valve circumscribing and rotating disk defines three L-shaped cam grooves. A first and shorter portion of each L-shaped groove extend in the circumferential direction on the rotating disk and maintains the lever arm and the cam follower outwardly so as to maintain the latch plate locked and the valve normally closed. A second and longer radially extending portion of each L-shaped cam surface permits the radial inward movement of the levers.

Three electromechanical solenoids act on the rotating disk—preferably each solenoid being powered by its own electrical circuit and of sufficient strength to rotate by itself the valve circumscribing ring. When the ring is rotated to bring the radially extending portion of the L into registry with the cam followers at the end of the lever, simultaneous inward movement of all levers occurs. Upon such simultaneous inward movement of the levers, simultaneous release of the latch plate occurs. The depressurization valve opens fully for the immediate relief of pressure.

BRIEF DESCRIPTION OF THE DRAWINGS

Other objects, features, and advantages of this invention will become more apparent after referring to the following specifications and attached drawings in which.

Figure 1A:
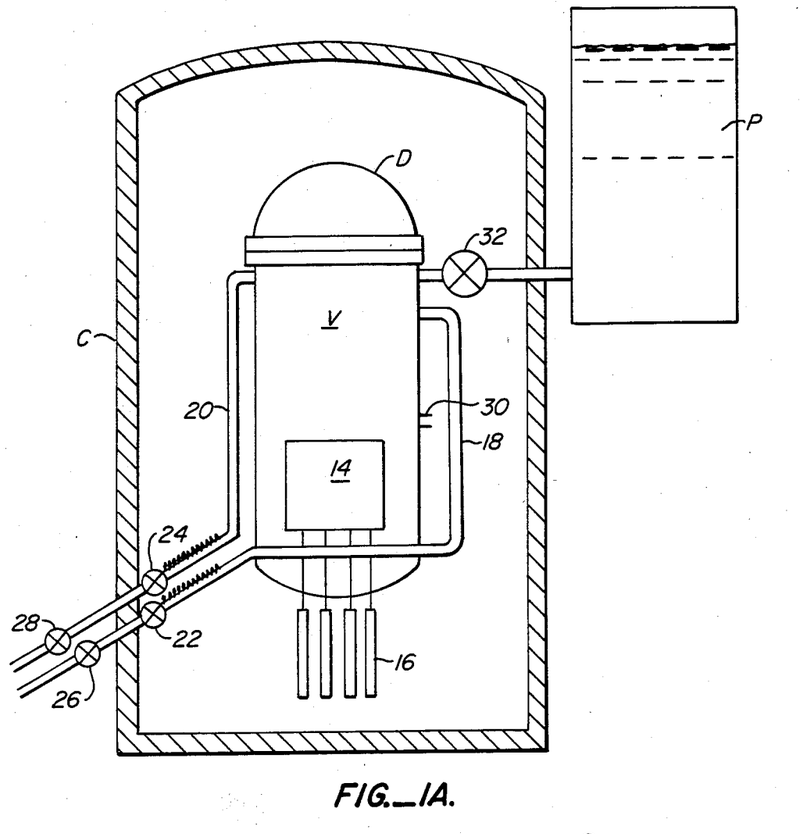
FIG. 1A is a schematic of a so-called simplified boiling water reactor illustrating a reactor having a core within a containment building with an overlying suppression pool and two outgoing steam lines, these steam lines being manifolded for the immediate release of pressure.

Referring to FIG. 1A, a simplified boiling water reactor is illustrated only in that detail necessary for the understanding of the utility of this invention. The reader will understand that many other and essential systems utilized with such reactors are omitted.

A containment building C is illustrated containing a reactor vessel V with a dome D. A reactor core 14 is illustrated controlled by control rods 16. It is understood that control rods 16 are only schematically illustrated.

Generated steam leaves reactor vessel V on two lines 18, 20. These two lines 18, 20 include main steam isolation valves 22, 24 inside containment building and 26. 28 outside containment building C in route to the turbine (not shown). Feedwater is injected into vessel V through a conduit 30 by a feedwater system (also not shown). Insofar as the transient scenario for use with the disclosed valves herein, it will be understood that a gravity suppression pool P connects via a stop valve 32 through a conduit into the vessel V.

Assuming an Anticipated Transient Without Scram (that is to say without the insertion of the control rods 16), two overall steps are taken.

First, pressure is completely relieved from the interior of reactor vessel V. It is relieved to the point where there is no resistance to the inflow of core quenching water from suppression pool P.

Second, valve 32 is opened. Pool P floods the reactor for the purpose of covering the core 14. When this much has been accomplished other measures can be taken to control the resultant casualty.

In order to effect relief of the pressure completely within vessel V, steam line 18 and steam line 20 is manifolded with two discrete types of valving. This valving is illustrated disposed on one steam line in the detail of FIG. 1B.

Figure 1B:
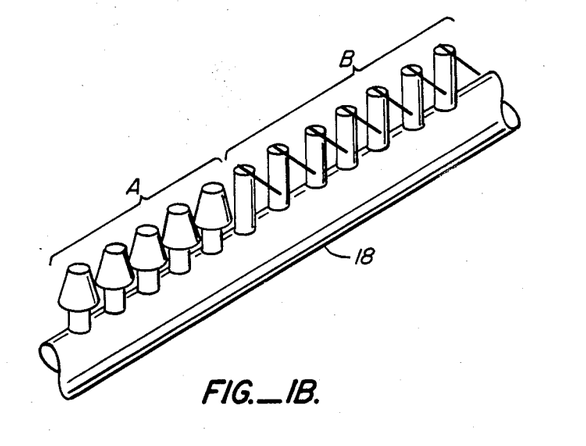
FIG. 1B is a section of a steam line manifolded for the immediate release of pressure including seven pressure safety valves and seven depressurization valves according to this invention.

Referring to FIG. 1B, at line 18, seven safety valves S are shown connected in parallel. Typically line 18 is on the order of 24 inches. Each of the safety valves is dimensioned in the order of ten inches. These safety valves are of the type wherein two responses can be invoked.

First, the safety valves will lift to maintain the pressure within the vessel to a predetermined high pressure in the order of 1,000 lbs.

Second, the safety valves S can be manually opened to assist in the complete release of pressure. Such valves are known and will not be further discussed herein.

Third, and on each of the lines 18, 20 there are seven depressurizaion valves A. Valves A are the type set forth herein. A typical valve A will now be set forth with respect to FIGS. 2A and 2B, FIG. 3, FIGS. 4A and 4B and finally the perspective view of FIG. 5.

Figure 2A:
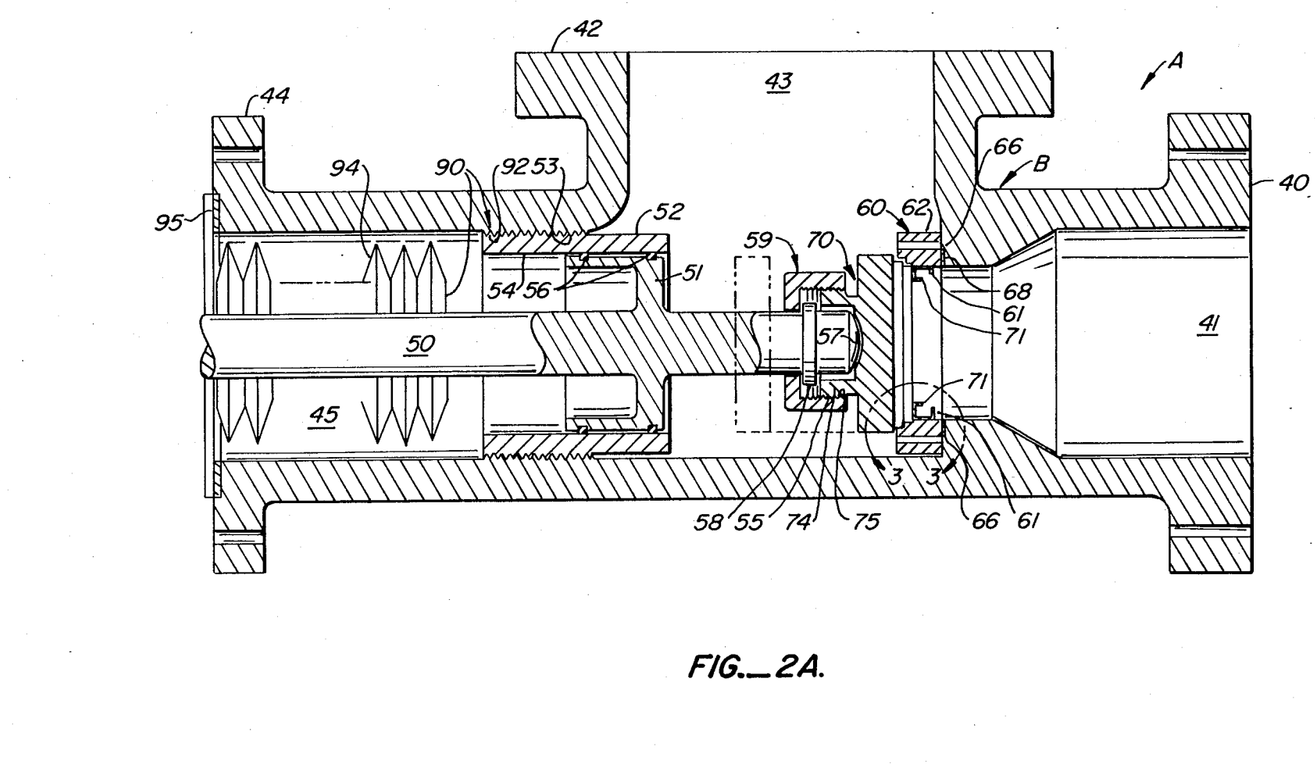
FIGS. 2A and 2B are side elevation sections of the depressurization valve of this invention with FIG. 2A illustrating the valve adjacent the seat guide piston and bellows and FIG. 2B illustrating the valve adjacent the stem flange latch plate and latch mechanism, it being noted that the latch mechanism is not completely shown.

Referring to FIG. 2A. a typical valve A includes a body B. Body B includes three separate flanges circumscribing three separate conduits.

Flange 40 circumscribes high pressure inlet 41 and valve body B. Flange 40 secures inlet 41 to the manifolding on steam lines 18 or 20. Opening 41 sees whatever steam pressure is present in the reactor.

Flange 42 circumscribes opening 43. Opening 43 is the discharge side of the depressurization valve.

Referring briefly to FIG. 1A. it can be seen that valve discharge occurs directly in containment building C. Condensation of the discharged steam occurs to the sides of the cooler containment building.

It can be understood that flange 42 can be communicated to piping. Such piping can lead to the reactor suppression pool. Since such piping does not change the effectiveness of the disclosed valve it will not be further herein discussed.

Finally a flange 44 defines the connection to the latch cylinder of this invention through an opening generally denominated as 45. It is through this opening that a valve stem 50 effects unsealing of the valve and discharge of the pressure.

Having set forth the main valve body B, attention will now be directed to the seat 60 and the sealing disk 70.

First, the sectional configuration of the seat 60 and disk 70 will be discussed. Welding of an endless membrane between the seat and disk will be set forth.

Second, the ability of the seat 60 and disk 70 to be fastened to the valve body as a unit through opening 45 will be set forth.

Finally, the insertion and attachment of the stem 50 to the disk 70 will be described.

Referring to FIG. 2A. it can be seen that valve seat 60 includes an annulus 62. Annulus 62 is bolted via bolts in apertures 64 to a boss 66 defined interior of the valve body B. Thus it is seen that seat 60 is removably attachable to and from the valve body B. An appropriate gasket 68 is provided to complete the seal.

Figure 3:
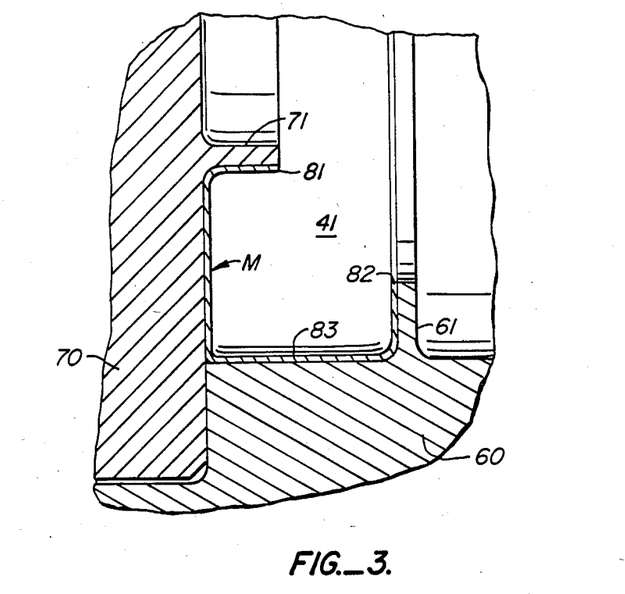
FIG. 3 is a section of FIG. 2B illustrating in section the placement of the membrane over the surface of the disk and seat utilizing the seat annulus and the disk annulus.

Referring to FIG. 3, it will be remembered that FIG. 3 is a detail taken along lines 3—3 of FIG. 2A. Disk 70 is shown seated in seat 60. A disk annulus 71 is illustrated protruding from the disk in a direction to, towards and through the seat. Disk annulus 71 is circular in configuration and extends entirely around disk 70. Similarly, there is configured a seat annulus 61. Seat annulus 61 protrudes inwardly to and towards opening 41 covered by the seat 60 and disk 70.

In the view of FIG. 3, the valve steam inlet allows steam to "see" membrane M. The membrane is thus disposed between the seat and disk and the high pressure steam. As will hereafter be set forth, this membrane must be ruptured for steam discharge to be accommodated by the valve.

A thin membrane M stands between the disk and seat over the surface of the disk and over the surface of the seat. This membrane is exposed to high pressure side 41 of the valve. Consequently, membrane M is pressed to the disk and seat by the high pressure interior of the steam line 18 and communicated through opening 41 of the valve.

Membrane M is initially configured as a ring being continuously cut from appropriate formed stainless steel sheet. It is cut at an inner and smaller opening 81 and cut again at a larger and outer opening 82. Both cuts are endless and have formed therebetween a tube shape 83. This tube shape 83 with the exception of the open interval between the endless boundaries 81. 82 is generally toroidal in shape Installation of the membrane M can be easily understood.

Typically, the seat 60 and disk 70 are at least partially confronted. Thereafter the toroidal shaped membrane M is introduced at the juncture between the seat 60 and disk 70. The seat 60 and disk 70 are then fully confronted with the membrane M being conformed intimately to the disk annulus 71, disk 70, seat 60 and seat annulus 61.

Thereafter, the ends of the annuluses 71. 61 are appropriately prepared for welding. Once these surfaces are prepared, an endless electron beam weld is made between each of the annuluses and the membrane M.

Considering the seat 60 and flange 70 with their membrane M welded in place as described, it will be realized that they can be handled as a separate unit. This separate completely detached unit independent of the valve body B. is convenient for weld of the membrane M. In particular, the disclosed piece can be rotated while the flange passes a stationary electron beam welding head.

Moreover, the annuluses 61, 71 form ideal surfaces for the electron beam welding of the membrane. That is to say, like the membrane, the annuluses 61, 71 being relatively thin pieces of metal, are capable of receiving the necessary heating for the desired welding without gross temperature discontinuities that would otherwise interfere with the integrity of the weld.

Having set forth the introduction of the membrane seal M between the seat 60 and disk 70, and remembering that the seat and disk, as fastened together, are an integral unit, the installation of this separate seat and disk interior of the valve body B can easily be understood.

Referring to FIG. 2A and in the absence of stem 50 and a guide cylinder 52, it will be immediately realized that flange 44 defines an opening 45 giving access for the installation of the seat 60 and disk 70 as a unit. Specifically, bolts (not shown) compress the seat 60 onto the gasket 68 effecting a firm seal of the seat and disk unit.

Having set forth the installation of the seat and disk, attention can now be devoted to the stem assembly.

First, installation of the stem assembly will be discussed with respect to FIG. 2A without reference to the remainder of the valve.

It can be seen that opening 45 defined at one end by flange 44 includes a threaded opening 90. Opening 90 has internal female threads 92.

A guide cylinder 52 having external male threads 53 is placed within threads 92. Access is preferably from opening 43.

The inside of guide cylinder 52 at 54 is finished. This inside 54 accommodates a guide piston 51 integrally formed to stem 50. The piston 51 is suitably supplied with rings 56 in order to provide both lubricity and alignment of the stem 50 in towards and away movement from disk 70.

The end of the valve stem 50 adjacent the disk 70 is provided with a disk retaining flange 58. Disk retaining flange is surrounded by a coupling 59 having internal threads 55.

Disk 70 away from seat 60 defines an upwardly extending flange 74 having outside threads 75. It can thus be seen that when stem 50 is lowered interior of disk flange 75 at end 57 and coupling 59 rotated, engagement between the respective threads 55, 75 occurs. Coupling 59 captures flange 58 to the disk 70. Thus, when stem 50 is removed, disk 70 will be compelled to be raised from seat 60, rupture membrane M and cause the valve to be opened.

Dependent upon the configuration of the valve, it is desirable that the valve in the open position prevent the blow by of hot evacuating stem into mechanisms of the valve above flange 44. Accordingly, a conventional bellows seal is provided. Bellow seal attaches to a disk 90 attached to stem 50 at one end and attaches to a plate 95 at the opposite end. The reader will understand that bellows 94 is normally expanded. Upon opening of the valve, bellows 94 compresses as stem 50 moves away from seat 60 with disk 70.

Figure 2B:
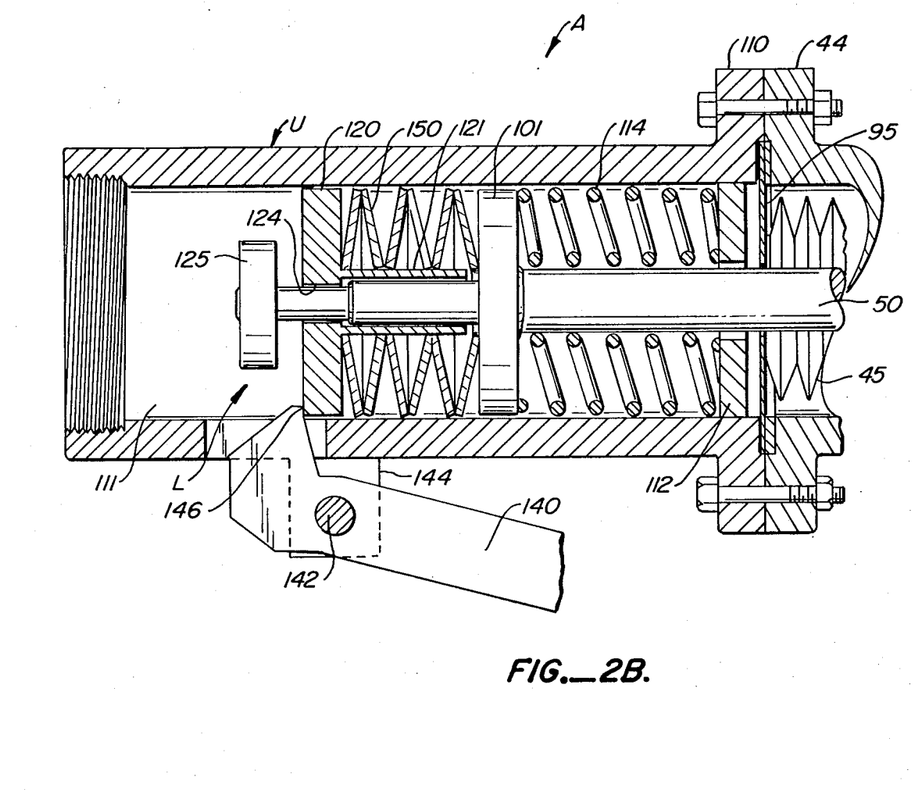

Having set forth the structure of the valve adjacent the seat with respect to FIG. 2A, the structure of the valve adjacent, including the latch mechanism L, will now be set forth.

Stem 50 includes an upper stem flange 101. Stem flange moves interior of an upper valve body U. Upper valve body U mates at a flange 110 to flange 44 of lower body B and defines a generally cylindrical opening 111. It is in opening 111 that upper stem flange 101 and a latch plate 120 move. In such movement, thermal expansion and forced opening of the valve is accommodated.

Referring to upper valve body U and adjacent flange 110 there is fastened a spring disk 112. Spring disk 112 accommodates a coil spring 114. Coil spring 114 is compressed. In this compression it bears against the portion of stem flange 101 adjacent disk 70 and against disk 112 fixed to upper valve body U adjacent flange 110.

Stopping here and referring briefly to FIG. 2A, it will be seen that spring 114 will cause disk 70 to be lifted free of seat 60. Indeed, spring 114 is given sufficient force in its compression to cause immediate lifting of the disk 70 with complete and substantially instantaneous rupture of the membrane M upon lifting. Absent any of the other portions of the valve, it will be clear that the valve would be normally open and instead o its intended normally closed construction.

Valve stem 50 continues upwardly. Valve stem 50 terminates at a boss or boss 125.

Latch plate 120 has a tube 121 stem 50 circumscribing and extending downwardly from latch plate 120. This tube 121 through its attachment to the latch plate prevents canting of the plate and possible jamming during valve release. Part 124 and latch plate 120 are dimensioned so that stem 50 is free to move through opening in latch plate 120 and part 124. At the same time, should latch plate 120 move upwardly, it will strike with percussive force the lower portion of boss or boss 125. As will hereinafter be developed, such striking will cause and assure immediate lifting of the disk 70 from the seat 60.

Referring to FIG. 2B, a latch 140 pivoting on a pivot 142 attached to an upper body mounted ear 144 is illustrated. A short end of lever 140 at hook 146 is shown holding latch plate 120 in the normally closed position.

Figure 4A:
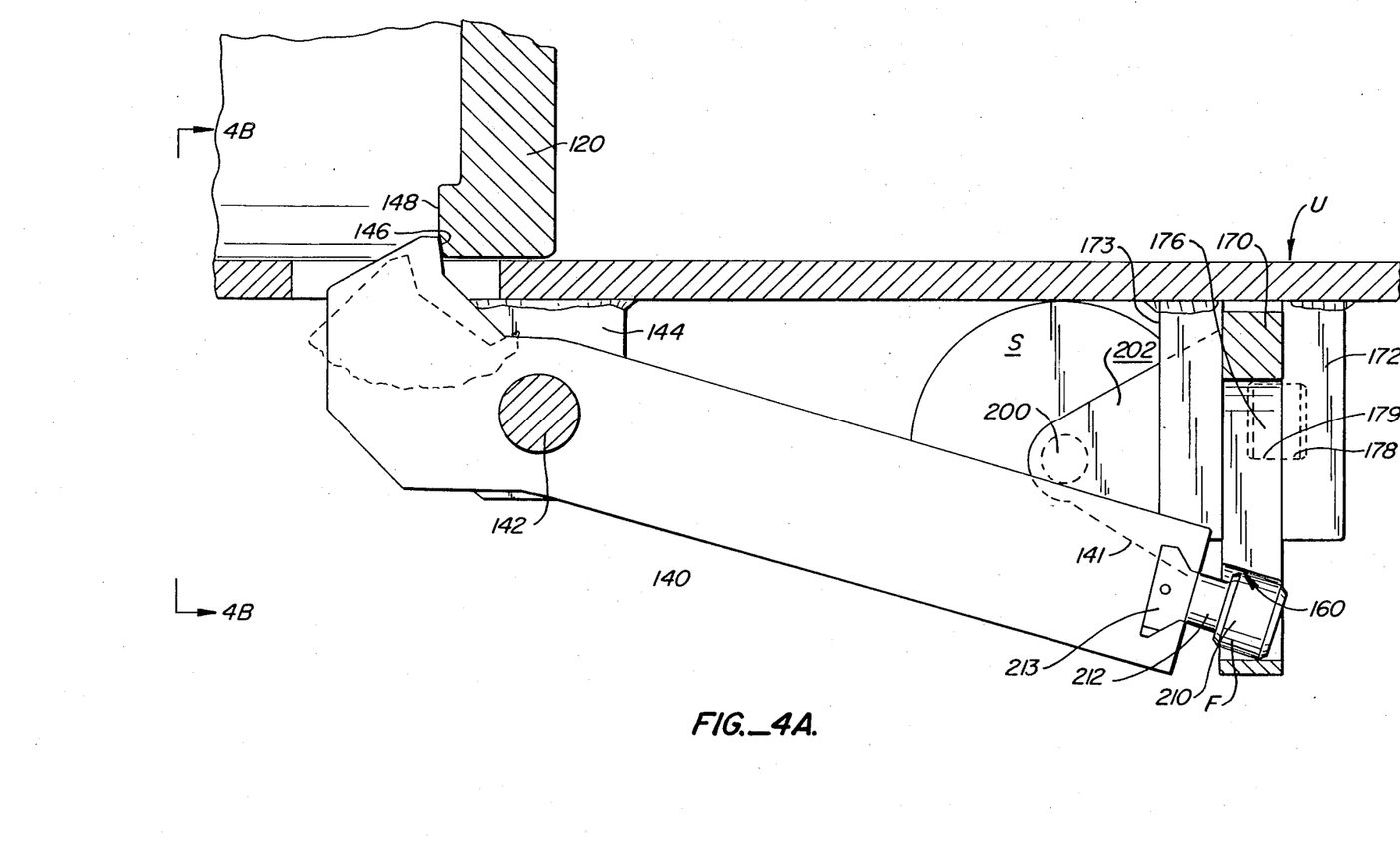
FIG. 4A is a side elevation section of a typical latch for releasing the latch plate.
Figure 4B:
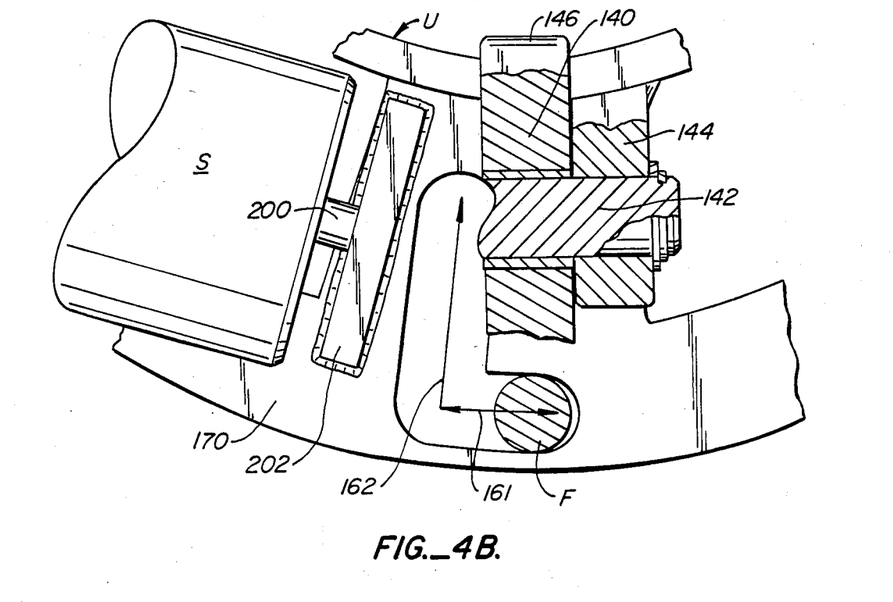
FIG. 4B is a plan view locally of the latch along lines 4B—4B of FIG. 4A.
Figure 4C:
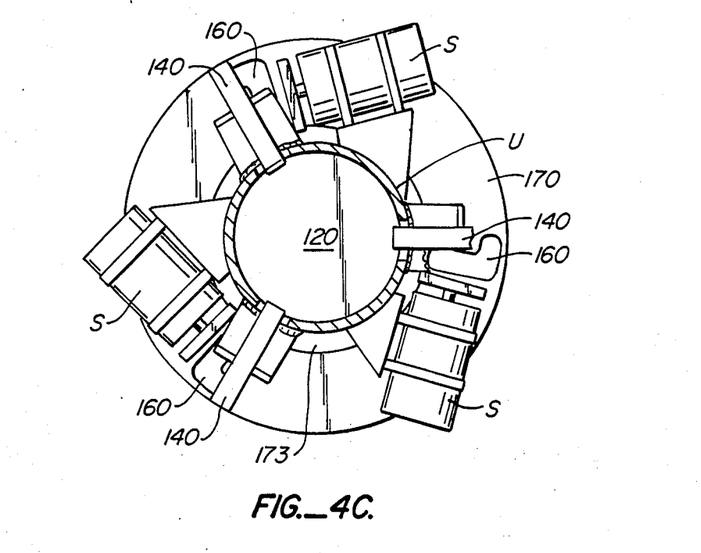
FIG. 4C is a view of the rotating cam plate for causing opening of the valve, with the scale of this drawing being reduced relative to FIG. 4B; and, FIG. 5 is a perspective view of the completed valve it being realized that complete understanding of the valve can only occur with reference to the sections of FIGS. 2A, 2B and 3. 4A and 4B.

Stopping here and having brief reference to FIG. 4C, it can be immediately understood that three latches 140 at 120° intervals are utilized. Thus, the substantially circular latch plate 120 is held interior of opening of 111 in the locked position shown in FIG. 2B.

Between stem flange 101 and that side of latch plate 120 disposed towards the valve seat 60 and the disk 70 are six series connected Belleville springs 150. These springs 150 are compressed with a relatively great force. Force of Belleville springs 150 is sufficient to overcome the bias of coil spring 114. Belleville springs 150 maintain disk 70 on seat 60 under considerable force, and during all postulated steam pressures.

It is thus instructive to enumerate the forces which compressed Belleville springs 150 overcome.

First, springs 150 are capable of overcoming full operating pressure of the reactor communicated to opening 41 acting on the inside of disk 70.

Second. Belleville springs 150 overcome the force of compression of coil spring 114. Setting of the disclosed valve to the normally closed position typically requires the use of hydraulics acting on latch plate 120 to effect full compression of the springs 150 and 114. When such full compression is effected and end 57 of stem 50 contacts the disk 70, rotation of the coupling 59 completes the attachment of the valve.

At this juncture, we have now explained the valve body. Reference will now be made to FIGS. 4A, 4B. and 4C. The latch mechanism L will be completely described. After the description of the latch mechanism, it will be possible to set forth the positive opening characteristics of the valve.

Referring to FIG. 4A. a typical latch 140 is illustrated. Latch 140 has a pivot 142. Additionally, latch 140 includes a short lever arm 146 bearing downwardly on latch plate 120. Short lever arm 146 is on one side of pivot 142. This occurs at a beveled surface 148, which beveled surface enables smooth release of the latch plate 120.

The latch 140 also includes a cam follower F at the remote and long end of the lever 140 from pivot 142. The remote and long end 141 of lever 140 is on the opposite side of pivot 142.

Cam follower F rotates within a cam surface 160 configured within a rotating plate 170. Rotating plate 170 rotates between lower guide plates 172 and upper guide plate 173 attached to the exterior of upper valve body U. To facilitate the rotation of guide plate 172, rollers 176 are placed within a guide plate raceway 178 and a rotating plate raceway 179. It will thus be understood that rotating plate 170 moves easily on top of the guide plate 172 in rotation.

It is desired to cause rotation of the rotating plate by electromechanical means. Accordingly, a conventional solenoid S affixed to valve body U has an actuating ram 200. Ram 200 strikes a ram plate 202 welded to cam 160. When ram 200 hits plate 202, it can be seen with reference to FIG. 4B that counterclockwise rotation of rotating plate 170 will occur.

Having established the counterclockwise rotation of 170, attention could now be devoted to the cam follower F and the cam cutout 160.

Cam follower F is a roller 210 attached at a roller fitting 212 at the end of latch 140. Follower 210 fits within and follows an L-shaped cam. The L-shaped cam 160 can be easily understood.

Cam 160 has two surfaces. These surfaces, like the member of a letter "L," are generally at right angles one to another. A first surface denominated by the arrow 161 is circumferential. It is circumferential of the rotating ring 170. It can be seen that as long as cam follower F is constrained to the path 161, latch 140 will remain in the closed position. That is to say, the long end 141 of the latch will be out from upper valve body U. When it is held outwardly from upper body U. short end 146 of latch 140 will hold latch plate 120 in place.

Upon actuation of solenoid S. ram 200 will contact ram plate 202. The second portion 162 of "L" shaped cam surface 160 will move into registration with cam follower F.

Referring to FIG. 4A. it will thus be seen that end 141 of latch 140 will be free to pivot inwardly as latch plate L is biased upwardly with the force of both Belleville springs 150 and coil spring 114. Such movement will be substantially instantaneous. When 15 such movement occurs, short end 146 of lever 140 will pivot free of latch plate 120. On pivoting free of latch plate 120, latch plate 120 will be free to move upwardly, clear of the end 146 of the latches 140.

It is preferred that the latch plate 120 be released by the latches 140 simultaneously. Such simultaneous release can be easily understood with the view of FIG. 4C.

FIG. 4C is a view similar to FIG. 4B with the scale reduced. Unlike FIG. 4B. FIG. 4C shows the entirety of the latch mechanism circumscribing the upper body member U of the valve.

It can also be observed that ring 170 has three cam surfaces 160. Each respective cam surface 160 registers to an end of the levers 140. In order to assure simultaneous release of all three latches 140, the cam followers assemblies will be individually adjustable in the circumferential direction by a slide and screw adjustment 213 between cam follower 210 and lever 140. Thus it can be seen that with rotation of ring 170 simultaneous release of each of the levers 140 will occur. Consequently, simultaneous release of latch plate 120 will likewise occur.

Having set forth an understanding of the release of the latch plate 120, the dynamics of the opening of the valve can be discussed. It will be shown that the latch plate, acting on the stem 50, causes a dynamic opening of the disk 70 from the seat 60 under all pressure conditions which can be resident on the valve.

Returning to FIG. 2B and presuming that latch 142 and short lever arm 146 is pivoted outwardly and clear of the latch plate, this opening phenomenon can be understood. It will be remembered that because of the rotation of the ring 170 all three such latches 140 have pivoted free and clear of the latch plate 120 at this instant. Latch plate 120 under the force of both spring 114 and Belleville spring 150 immediately moves upwardly of stem 50. It moves upwardly of stem 50 until it strikes boss 125 at the end of stem 50. Boss 125 is hit by the latch plate 120 with a dynamic percussive upward blow of great force. Stem 50 acts at end 57 through flang 58 and coupling 59 onto disk 70. Specifically. The disk 70 is torn free of the seat 60.

Referring to FIG. 3, the rupture of the membrane M can be easily understood. Specifically. and in the upward movement of the disk 70. the endless weld of membrane M at 81 will move rapidly upward. Membrane M will stretch. Such stretching will occur between weld 81 and weld 82.

Two forces will act to destroy the membrane simultaneously.

First, as soon as the membrane M begins to pull clear of the surfaces of the disk and the seat. the pressure interior of opening 41 of the pressure discharge valve will cause the membrane M to rupture.

Second, and when the distance between the welds 81 and 82 exceeds the length of the membrane M. tearing will occur. Simply stated, with release of the latch plate L, membrane M will be ruptured and torn asunder.

Figure 5:
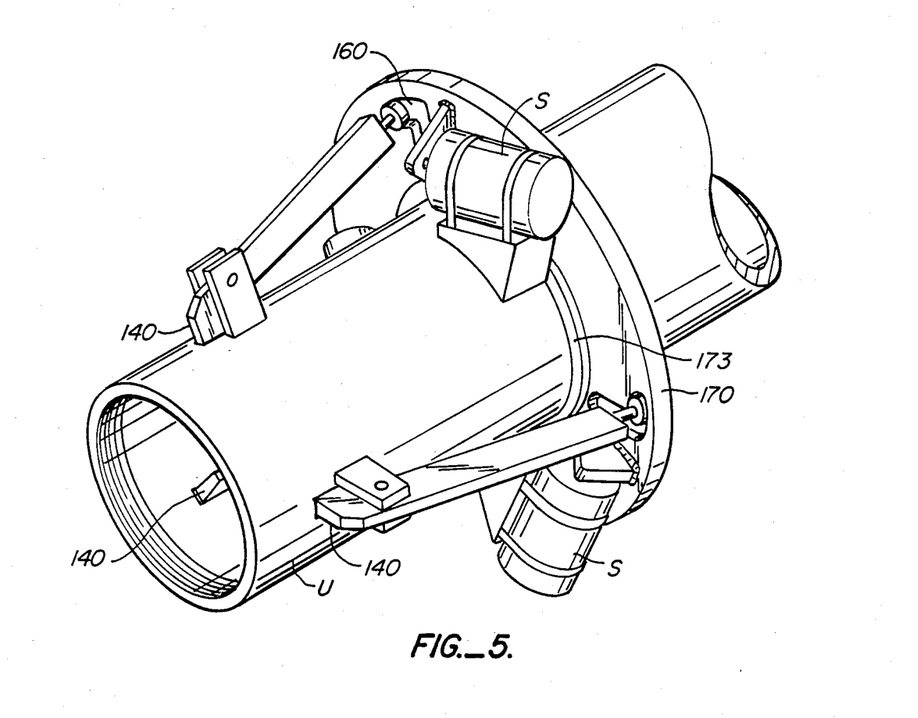

Referring briefly to FIG. 5, a perspective of the assembled valve is illustrated. The reader can see lower body B, upper body U, the rotating plate 170 and the disk disposition of the latch L. This figure is generally instructive in light of the foregoing description.

I have shown a disk flange 71 and a seat flange 61. These members are essentially weld discontinuities which enable the weld to be efficiently placed. Other weld discontinuities can also be used. For example, annular recesses welded at a corner will do as well with modern techniques. While the disclosed flanges are preferred, they are not required.

What is claimed is:

1. A normally closed depressurization valve having a membrane between a valve seat and a valve disk comprising in combination:
   a valve body for defining a conduit therethrough for permitting pressure to escape from one side of said valve body through said conduit to the other side of said valve body:
   a seat mounted in said conduit configured to receive a valve disk, said seat receiving said disk to dispose the surface of said disk on said seat towards a high pressure portion of said valve body:
   a valve disk configured to fit over said seat in sealing relationship with respect to said seat:
   means for normally maintaining said disk on said seat:
   means for releasing said disk from said seat:
   a seat weld discontinuity disposed on said seat below said disk, said seat weld discontinuity circumscribing the interior of said seat and extending radially of said seat below said disk for forming a first surface for the endless weld of a membrane to said valve seat and said seat annulus:
   a disk weld discontinuity extending on the surface of said disk at the side of said disk disposed to said seat for forming a second surface for the endless weld of a membrane to said valve disk
   a generally toroidal shaped membrane having an endless outer extremity, an endless inner extremity and a gap therebetween, said toroid being conformable over said seat weld discontinuity, said seat, said disk and said disk weld discontinuity to line the high pressure side of said seat and disk with a membrane:
   a first endless weld to said valve seat between said seat weld discontinuity and said membrane to weld one extremity of said membrane continuously to said seat; and,
   a second endless weld to said disk between said disk weld discontinuity and membrane at said other endless extremity of said membrane whereby said membrane then reposed between said endless welds over the surface of said seat and disk enables leak free sealing of said valve between said sea and disk.

2. The invention of claim 1 and wherein said seat and flange together are removably attachable to and from said valve body.

3. In a normally closed depressurization valve having a seal between a valve seat and a valve disk wherein said depressurization valve includes:
   a valve body having a high pressure opening exposed to a fluid source to be depressurized and an exhaust opening;
   a seat and disk disposed in the opening of said valve body for normally sealing said valve in the closed position,
   means for maintaining said disk on said seat for having said valve normally closed; and
   means for releasing said disk from said seat to open said normally closed valve; the improvement in said seat and disk comprising in combination;
   a seat weld discontinuity at a first portion of said valve seat below said disk on the high pressure side of said valve;
   a valve disk weld discontinuity for placement on said valve disk immediately adjacent said seat;
   a membrane having an endless outer extremity and an endless inner extremity and being conformable over the surface of said seat and disk with said endless extremities disposed to said weld discontinuities;
   a first endless weld to said valve seat between one of said membrane extremities and said seat weld discontinuity;
   a second endless weld to said disk between the other extremity of said membrane and said disk weld discontinuity whereby said membrane when reposed between said endless seals enables weep free sealing of said valve between said seat and disk.

4. The invention of claim 3 and wherein said seat, disk and membrane are together a removably detachable assembly from said valve body.

5. A depressurization valve for opening responsive to the release of a latch independent of all containment pressures contained by said depressurization, said depressurization valve comprising a valve body defining a conduit, said conduit communicated to said pressure source to be depressurized and having an outlet;
   a valve seat configured in said valve conduit for closure by a disk, said disk closing from a first side of said seat communicated to and towards the fluid pressure source to be relieved;
   a valve disk configured for closing said seat from said venting side of said seat to and towards said fluid pressure side of said seat;
   a valve stem attached to said valve disk for maintaining said disk on said seat in the closed position relative to said seat and moving said disk under tension upwardly in response to opening of said valve;
   a valve latch adjacent the top of said stem for holding said valve in the closed position, said valve latch, upon release, permitting movement of said stem and attached disk to the opened position;
   a stem flange attached to said stem intermediate said disk and said valve latch;
   first spring means surrounding said stem between said stem flange and disk and acting between said valve body above said disk and said stem flange for urging said stem upwardly and clear of said seat independent of pressures on said seat whereby said valve disk will open responsive to movement of said first spring means;
   second spring means surrounding said stem and acting between said latch and said stem flange for overcoming said first spring means and maintaining said valve in the normally closed position; and, means for permitting relative movement of said latch with respect to said stem for the accommodation of thermal expansion of said stem.

6. The depressurization valve of claim 5 and wherein said latch includes;

a latch plate;

said latch plate circumscribing said stem;

said stem includes a portion of said stem transpiercing said latch plate and extending above said latch plate;

and a boss at the end of said stem for capturing said latch plate to said stem;

and latch plate release means for releasing said latch plate to open said valve whereby said latch plate impacts said boss to move said stem and attached disk upwardly and clear of said seat.

7. A depressurization valve in combination;

a valve body defining a conduit, said conduit communicated at one end to a pressure source to be relieved of pressure and communicating at the other end to a vent for exhaust of fluid under pressure;

a valve seat defined interior of said valve body said seat disposed for sealing by a disk said disk moving from the vent side of said valve conduit to and towards said seat to seal the pressure side of said valve body conduit;

a valve disk configured to mate with said seat from the vent side of said seat to and towards the pressure side of said seat for preventing the release of fluid pressure from said pressure source;

a stem contacting said disk at one end and extending upwardly of said valve body to a latched plate;

a latch plate surrounding the upper portion of said stem and cooperatively attached to said stem for causing said stem to move upwardly with said latch plate to open said disk from said seat;

latch release means for normally maintaining said latch to maintain said disk closed through said stem and release said latch plate to permit said stem to move upwardly to lift said disk from said seat and open said valve, said latch release means comprising:

a plurality of levers spaced at equal angular intervals around said latch plate;

each lever including a first end for contact with said latch plate, a second end for restraining contact with a cam; and a pivot therebetween for permitting movement of said first end of said lever into and out of restraining contact with said latch;

a plate having a plurality of cams for engagement with the lower end of said levers, said cam including a corresponding plurality of cam surfaces corresponding to each lever, said cam plate operable for moving al of said cam surfaces with simultaneity for movement for permitting the second end of said levers to move from a latch restraining position to a latch release position whereby said latch plate is releasable to permit movement of said stem and disk with respect to said seat to open said valve.

8. The invention of claim 7 and wherein said plate circumscribes said valve.

9. The invention of claim 7 and wherein each of said cam surfaces has an "L" shaped configuration with a first portion of said "L" for maintaining lever contact with said latch plate and a second portion of said "L" for releasing said latch plate to close said valve.

* * * * *